United States Patent
Lucas et al.

(10) Patent No.: US 9,122,636 B2
(45) Date of Patent: Sep. 1, 2015

(54) HARD POWER FAIL ARCHITECTURE

(71) Applicant: SanDisk Enterprise IP LLC, Milpitas, CA (US)

(72) Inventors: Gregg S. Lucas, Tucson, AZ (US); Kenneth B. Delpapa, Natick, MA (US); Lace J. Herman, Longmont, CO (US); Robert W. Ellis, Phoenix, AZ (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 101 days.

(21) Appl. No.: 14/135,417

(22) Filed: Dec. 19, 2013

(65) Prior Publication Data
US 2015/0149806 A1 May 28, 2015

Related U.S. Application Data

(60) Provisional application No. 61/909,924, filed on Nov. 27, 2013.

(51) Int. Cl.
| | |
|---|---|
| G06F 11/00 | (2006.01) |
| G06F 11/14 | (2006.01) |
| G06F 1/24 | (2006.01) |
| G06F 3/06 | (2006.01) |

(52) U.S. Cl.
CPC .............. *G06F 11/1441* (2013.01); *G06F 1/24* (2013.01); *G06F 3/0625* (2013.01); *G06F 3/0655* (2013.01); *G06F 3/0688* (2013.01); *G06F 11/1456* (2013.01)

(58) Field of Classification Search
CPC ..... G06F 1/24; G06F 3/0625; G06F 11/1441; G06F 11/1456
See application file for complete search history.

(56) References Cited

U.S. PATENT DOCUMENTS

| | | | |
|---|---|---|---|
| 4,600,962 A * | 7/1986 | Bliehall | ........................ 361/77 |
| 4,916,652 A | 4/1990 | Schwarz et al. | |
| 5,193,176 A | 3/1993 | Brandin | |
| 5,519,847 A | 5/1996 | Fandrich et al. | |

(Continued)

FOREIGN PATENT DOCUMENTS

| | | |
|---|---|---|
| EP | 1465203 A1 | 10/2004 |
| EP | 1 956 489 A2 | 8/2008 |

(Continued)

OTHER PUBLICATIONS

Barr, Introduction to Watchdog Timers, Oct. 2001, 3 pgs.

(Continued)

*Primary Examiner* — Joshua P Lottich
(74) *Attorney, Agent, or Firm* — Morgan, Lewis & Bockius LLP

(57) ABSTRACT

The various implementations described herein include systems, methods and/or devices used to enable power sequencing and data hardening in a storage device. In one aspect, the method includes determining whether a power supply voltage provided to the storage device is higher than an over-voltage threshold. The method further includes, in accordance with a determination that the power supply voltage is higher than the over-voltage threshold, performing a power fail operation, the power fail operation including: (1) signaling a power fail condition to a plurality of controllers on the storage device, (2) transferring data held in volatile memory to non-volatile memory, and (3) removing power from the plurality of controllers on the storage device.

27 Claims, 11 Drawing Sheets

(56) References Cited

U.S. PATENT DOCUMENTS

| | | |
|---|---|---|
| 5,530,705 A | 6/1996 | Malone, Sr. |
| 5,537,555 A | 7/1996 | Landry et al. |
| 5,551,003 A | 8/1996 | Mattson et al. |
| 5,657,332 A | 8/1997 | Auclair et al. |
| 5,666,114 A | 9/1997 | Brodie et al. |
| 5,943,692 A | 8/1999 | Marberg et al. |
| 5,982,664 A | 11/1999 | Watanabe |
| 6,000,006 A | 12/1999 | Bruce et al. |
| 6,016,560 A | 1/2000 | Wada et al. |
| 6,295,592 B1 | 9/2001 | Jeddeloh |
| 6,311,263 B1 | 10/2001 | Barlow et al. |
| 6,393,584 B1 | 5/2002 | McLaren et al. |
| 6,442,076 B1 | 8/2002 | Roohparvar |
| 6,449,625 B1 | 9/2002 | Wang |
| 6,484,224 B1 | 11/2002 | Robins et al. |
| 6,678,788 B1 | 1/2004 | O'Connell |
| 6,738,268 B1 * | 5/2004 | Sullivan et al. ............ 363/49 |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,871,257 B2 | 3/2005 | Conley et al. |
| 6,895,464 B2 | 5/2005 | Chow et al. |
| 6,978,343 B1 | 12/2005 | Ichiriu |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,032,123 B2 | 4/2006 | Kane et al. |
| 7,043,505 B1 | 5/2006 | Teague et al. |
| 7,100,002 B2 | 8/2006 | Shrader |
| 7,111,293 B1 | 9/2006 | Hersh et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,516,292 B2 | 4/2009 | Kimura et al. |
| 7,523,157 B2 | 4/2009 | Aguilar, Jr. et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,971,112 B2 | 6/2011 | Murata |
| 7,978,516 B2 | 7/2011 | Olbrich et al. |
| 7,996,642 B1 | 8/2011 | Smith |
| 8,001,419 B2 | 8/2011 | Killian et al. |
| 8,032,724 B1 | 10/2011 | Smith |
| 8,412,985 B1 | 4/2013 | Bowers et al. |
| 2002/0024846 A1 | 2/2002 | Kawahara et al. |
| 2002/0083299 A1 | 6/2002 | Van Huben et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0074592 A1 | 4/2003 | Hasegawa |
| 2003/0088805 A1 | 5/2003 | Majni et al. |
| 2003/0093628 A1 | 5/2003 | Matter et al. |
| 2003/0126494 A1 | 7/2003 | Strasser |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2004/0252670 A1 | 12/2004 | Rong et al. |
| 2005/0060456 A1 | 3/2005 | Shrader et al. |
| 2005/0060501 A1 | 3/2005 | Shrader |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0039196 A1 | 2/2006 | Gorobets et al. |
| 2006/0053246 A1 | 3/2006 | Lee |
| 2006/0085671 A1 | 4/2006 | Majni et al. |
| 2006/0136570 A1 | 6/2006 | Pandya |
| 2006/0156177 A1 | 7/2006 | Kottapalli et al. |
| 2006/0195650 A1 | 8/2006 | Su et al. |
| 2006/0259528 A1 | 11/2006 | Dussud et al. |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0083779 A1 | 4/2007 | Misaka et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0277036 A1 | 11/2007 | Chamberlain et al. |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0052446 A1 | 2/2008 | Lasser et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2009/0003058 A1 | 1/2009 | Kang |
| 2009/0037652 A1 | 2/2009 | Yu et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0222708 A1 | 9/2009 | Yamaga |
| 2009/0296466 A1 | 12/2009 | Kim et al. |

(56) References Cited

U.S. PATENT DOCUMENTS

| | | | |
|---|---|---|---|
| 2009/0296486 A1 | 12/2009 | Kim et al. | |
| 2009/0319864 A1 | 12/2009 | Shrader | |
| 2010/0008175 A1 | 1/2010 | Sweere et al. | |
| 2010/0061151 A1 | 3/2010 | Miwa et al. | |
| 2010/0095048 A1* | 4/2010 | Bechtolsheim et al. | 711/103 |
| 2010/0103737 A1 | 4/2010 | Park | |
| 2010/0199125 A1 | 8/2010 | Reche | |
| 2010/0202196 A1 | 8/2010 | Lee et al. | |
| 2010/0208521 A1 | 8/2010 | Kim et al. | |
| 2010/0262889 A1 | 10/2010 | Bains | |
| 2010/0281207 A1 | 11/2010 | Miller et al. | |
| 2010/0281342 A1 | 11/2010 | Chang et al. | |
| 2011/0066872 A1 | 3/2011 | Miller et al. | |
| 2011/0083060 A1 | 4/2011 | Sakurada et al. | |
| 2011/0085657 A1 | 4/2011 | Matthews, Jr. | |
| 2011/0113281 A1 | 5/2011 | Zhang et al. | |
| 2011/0131444 A1 | 6/2011 | Buch et al. | |
| 2011/0205823 A1 | 8/2011 | Hemink et al. | |
| 2011/0213920 A1 | 9/2011 | Frost et al. | |
| 2011/0228601 A1 | 9/2011 | Olbrich et al. | |
| 2011/0231600 A1 | 9/2011 | Tanaka et al. | |
| 2012/0054456 A1 | 3/2012 | Grube et al. | |
| 2012/0096217 A1 | 4/2012 | Son et al. | |
| 2012/0195126 A1 | 8/2012 | Roohparvar | |
| 2012/0239976 A1 | 9/2012 | Cometti et al. | |
| 2012/0271990 A1 | 10/2012 | Chen et al. | |
| 2013/0019076 A1 | 1/2013 | Amidi et al. | |
| 2014/0006798 A1 | 1/2014 | Prakash et al. | |

FOREIGN PATENT DOCUMENTS

| | | |
|---|---|---|
| JP | 2002-532806 S | 10/2002 |
| WO | WO 2007/036834 A2 | 4/2007 |
| WO | WO 2007/080586 A2 | 7/2007 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/134576 A1 | 11/2009 |

OTHER PUBLICATIONS

Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology—AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/U52012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
IBM Corporation, "Systems Management, Work Management," Version 5, Release 4, 9th Edition, Feb. 2006, pp. 1-21.
Texas Instruments, "Power Management IC for Digital Set Top Boxes," SLVSA10A, Sep. 2009, pp. 1-22.
International Search Report and Written Opinion dated Jan. 26, 2015, received in International Patent Application No. PCT/US2014/059118, which corresponds to U.S. Appl. No. 14/135,371, 11 pages (Lucas).
International Search Report and Written Opinion dated Jul. 26, 2013, received in International Patent Application No. PCT/US2013/035162, which corresponds to U.S. Appl. No. 13/855,567, 7 pages (Ellis).
International Preliminary Report on Patentability dated Oct. 30, 2014, received in International Patent Application No. PCT/US2013/035162, which corresponds to U.S. Appl. No. 13/855,567, 4 pages (Ellis).
International Search Report and Written Opinion dated May 27, 2015, received in International Patent Application No. PCT/US2014/067476, which corresponds to U.S. Appl. No. 14/135,417, 14 pages (Lucas).

* cited by examiner

HARD POWER FAIL ARCHITECTURE

RELATED APPLICATIONS

This application claims priority to U.S. Provisional Patent Application No. 61/909,924 filed Nov. 27, 2013, which is hereby incorporated by reference in its entirety.

TECHNICAL FIELD

The disclosed embodiments relate generally to memory systems, and in particular, to power sequencing and data hardening in data storage devices.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile or persistent memory (e.g., flash memory, as well as other types of non-volatile memory implemented using any of a variety of technologies) retains stored information even when not powered, as opposed to volatile memory, which requires power to maintain the stored information.

Data hardening, the saving of data and mission critical metadata held in volatile storage, is an integral part of a storage device. When there is a power failure, mission critical data may reside in volatile memory in a number of sub-system components. Coordinating and managing multiple sub-system components to ensure that volatile data is saved successfully is important for protecting data in a storage device.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable power sequencing and data hardening in data storage devices. In one aspect, a power fail operation is performed in accordance with a determination that a power supply voltage provided to a storage device is higher than an over-voltage threshold.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
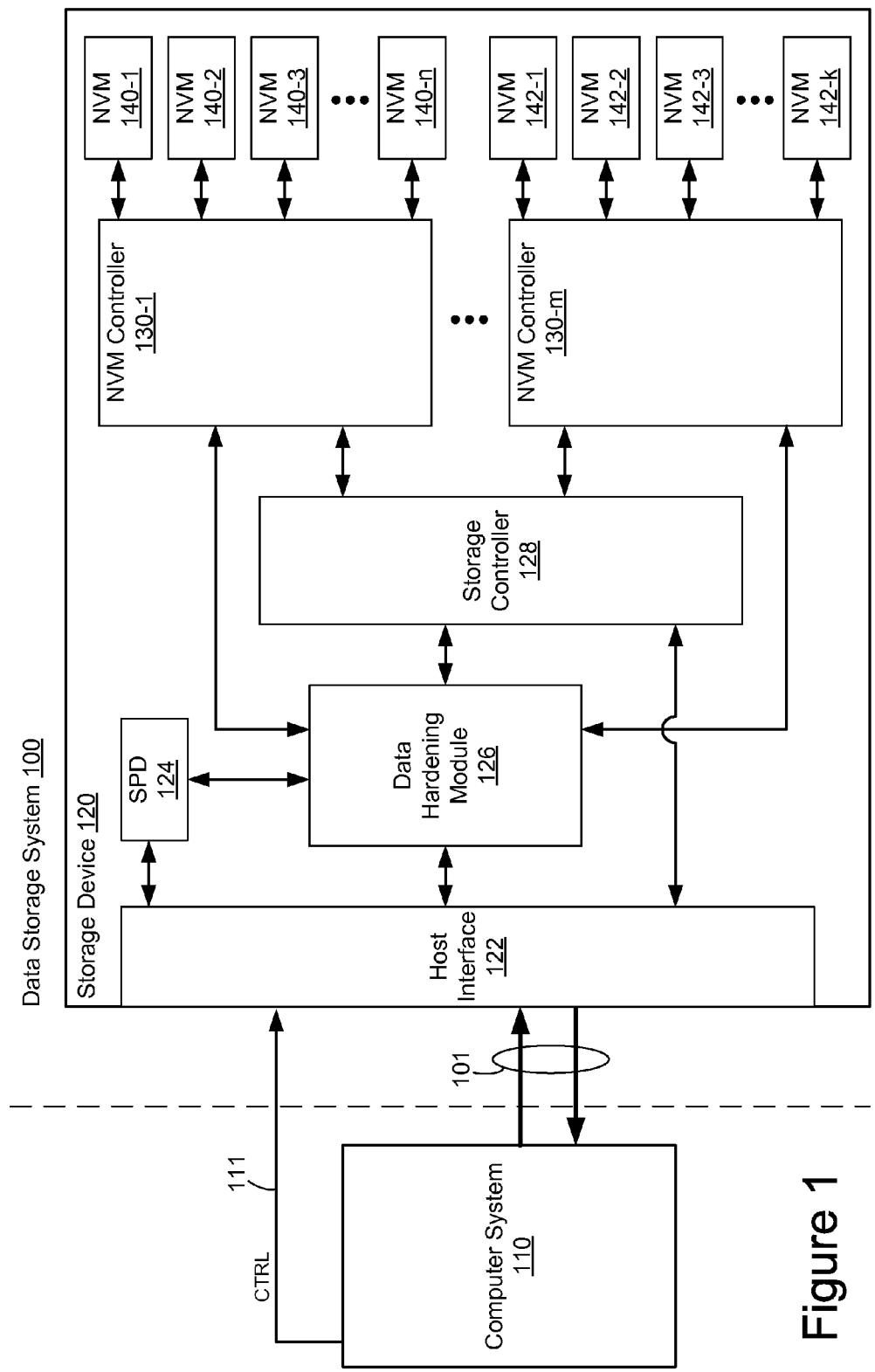
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable power sequencing and data hardening in data storage devices. Some implementations include systems, methods and/or devices to perform a power fail operation in accordance with a determination that a power supply voltage provided to a storage device is higher than an over-voltage threshold.

More specifically, some implementations include a method of protecting data in a storage device. In some implementations, the method includes determining whether a power supply voltage provided to the storage device is higher than an over-voltage threshold. The method further includes, in accordance with a determination that the power supply voltage is higher than the over-voltage threshold, performing a power fail operation, the power fail operation including: (1) signaling a power fail condition to a plurality of controllers on the storage device, (2) transferring data held in volatile memory to non-volatile memory, and (3) removing power from the plurality of controllers on the storage device.

In some embodiments, the plurality of controllers on the storage device include a storage controller (sometimes herein called a memory controller) and one or more non-volatile memory (NVM) controllers, the one or more NVM controllers coupled by the storage controller to a host interface of the storage device.

In some embodiments, transferring data held in volatile memory to non-volatile memory includes: (1) transferring data from the storage controller to the one or more NVM controllers, and (2) transferring data from the one or more NVM controllers to the non-volatile memory.

In some embodiments, removing power from the plurality of controllers on the storage device includes: (1) resetting the storage controller subsequent to transferring data from the storage controller to the one or more NVM controllers, and (2) removing power from the storage controller subsequent to resetting the storage controller.

In some embodiments, the one or more NVM controllers include a first NVM controller and a second NVM controller, and removing power from the plurality of controllers on the storage device includes: (1) resetting the first NVM controller subsequent to transferring data from the first NVM controller to the non-volatile memory, (2) resetting the second NVM controller subsequent to transferring data from the second NVM controller to the non-volatile memory, and (3) removing power from the first and the second NVM controllers subsequent to resetting the first and second NVM controllers.

In some embodiments, removing power from the first and the second NVM controllers is subsequent to removing power from the storage controller.

In some embodiments, the power fail operation is performed to completion regardless of whether the power supply voltage returns to a voltage lower than or equal to the over-voltage threshold.

In some embodiments, the power supply voltage is a voltage supplied by a host system.

In some embodiments, the power supply voltage is a voltage supplied for serial presence detect (SPD) functionality.

In some embodiments, the power supply voltage includes a first voltage and a second voltage, and performing the power fail operation includes: (1) performing the power fail operation in accordance with a determination that the first voltage is higher than a first over-voltage threshold, and (2) performing the power fail operation in accordance with a determination that the second voltage is higher than a second over-voltage threshold.

In some embodiments, power fail operation is performed using power from a reserve energy storage device.

In some embodiments, the power fail operation is performed using power from an energy storage device on the storage device.

In some embodiments, the energy storage device includes one or more capacitors.

In some embodiments, the method further includes (1) monitoring the energy storage device to ensure capacitors in the energy storage device are charged to at least a first charge level, and (2) selectively testing one or more capacitors from the energy storage device during operation of the storage device.

In some embodiments, the method further includes, prior to determining whether the power supply voltage provided to the storage device is higher than the over-voltage threshold, (1) charging the energy storage device using a higher voltage than the power supply voltage provided to the storage device, (2) determining whether the energy storage device meets a minimum charge level threshold within a predefined charge time, and (3) in accordance with a determination that the energy storage device does not meet the minimum charge level threshold in the predefined charge time, preventing operation of the storage device.

In some embodiments, preventing operation of the storage device includes communicating a failure message to a host system.

In some embodiments, the method further includes discharging the energy storage device subsequent to removing power from the plurality of controllers on the storage device.

In some embodiments, the non-volatile memory comprises one or more NVM devices.

In some embodiments, the storage device includes a dual in-line memory module (DIMM) device.

In some embodiments, the plurality of controllers on the storage device include at least one non-volatile storage controller and at least one other storage controller other than the at least one non-volatile storage controller.

In some embodiments, one of the plurality of controllers on the storage device maps double data rate (DDR) interface commands to serial advance technology attachment (SATA) interface commands.

In another aspect, any of the methods described above are performed by a storage device including (1) an interface for coupling the storage device to a host system, (2) a plurality of controllers, each of the plurality of controllers configured to transfer data held in volatile memory to non-volatile memory, and (3) a data hardening module including an energy storage device, the data hardening module configured to: (a) determine whether a power supply voltage provided to the storage device is higher than an over-voltage threshold, and (b) in accordance with a determination that the power supply voltage is higher than the over-voltage threshold, perform a power fail operation, the power fail operation including: (i) signaling a power fail condition to the plurality of controllers, causing the plurality of controllers to transfer data held in volatile memory to non-volatile memory, and (ii) removing power from the plurality of controllers on the storage device.

In some embodiments, the over-voltage threshold is programmable.

In some embodiments, the data hardening module includes one or more processors.

In some embodiments, wherein signaling the power fail condition to the plurality of controllers on the storage device includes separately signaling the power fail condition to each of the plurality of controllers.

In some embodiments, the method further includes recording data regarding the power fail operation to non-volatile memory.

In some embodiments, the method further includes performing a power fail test operation, the power fail test operation including: (1) signaling the power fail condition to one or more controllers of the plurality of controllers on the storage device, (2) for the one or more controllers, transferring data held in volatile memory to non-volatile memory, (3) removing power from the one or more controllers on the storage device, and (4) recording data regarding the power fail test operation.

In some embodiments, the storage device is configured to perform any of the methods described above.

In yet another aspect, any of the methods described above are performed by a storage device operable to protect data. In some embodiments, the device includes (1) an interface for coupling the storage device to a host system, (2) means for determining whether a power supply voltage provided to the storage device is higher than an over-voltage threshold, and (3) means for performing a power fail operation, in accordance with a determination that the power supply voltage is higher than the over-voltage threshold, the means for performing the power fail operation including: (a) means for signaling a power fail condition to a plurality of controllers on the storage device, (b) means for transferring data held in volatile memory to non-volatile memory, and (c) means for removing power from the plurality of controllers on the storage device.

In yet another aspect, a non-transitory computer readable storage medium, storing one or more programs for execution by one or more processors of a storage device having a plurality of controllers and a data hardening module, the one or more programs including instructions for performing any of the methods described above.

In some embodiments, the non-transitory computer readable storage medium includes a non-transitory computer readable storage medium associated with each of the plurality of controllers on the storage device and a non-transitory computer readable storage medium associated with the data hardening module.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120 (also sometimes called an information storage device, or a data storage device, or a memory device), which includes host interface 122, serial presence detect (SPD) device 124, data hardening module 126, storage controller 128, one or more non-volatile memory (NVM) controllers 130 such as flash controllers, and non-volatile memory (e.g., one or more NVM device(s) 140, 142 such as one or more flash memory devices), and is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to storage device 120 through data connections 101. However, in some implementations computer system 110 includes storage device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

In some implementations, storage device 120 includes NVM devices 140, 142 such as flash memory devices (e.g., NVM devices 140-1 through 140-n and NVM devices 142-1 through 142-k) and NVM controllers 130 (e.g., NVM controllers 130-1 through 130-m). In some implementations, each NVM controller of NVM controllers 130 include one or more processing units (also sometimes called CPUs or processors or microprocessors or microcontrollers) configured to execute instructions in one or more programs (e.g., in NVM controllers 130). In some implementations, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile storage controller(s).

In some implementations, storage device 120 also includes host interface 122, SPD device 124, data hardening module 126, and storage controller 128. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some implementations, data hardening module 126 includes one or more processing units (also sometimes called CPUs or processors or microprocessors or microcontrollers) configured to execute instructions in one or more programs (e.g., in data hardening module 126). In some implementations, the one or more processors are shared by one or more components within, and in some cases, beyond the function of data hardening module 126. Data hardening module 126 is coupled to host interface 122, SPD device 124, storage controller 128, and NVM controllers 130 in order to coordinate the operation of these components, including supervising and controlling functions such as power up, power down, data hardening, charging energy storage device(s), data logging, and other aspects of managing functions on storage device 120.

Storage controller 128 is coupled to host interface 122, data hardening module 126, and NVM controllers 130. In some implementations, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other implementations, the device interface used by storage controller 128 to communicate with NVM controllers 130 is SAS (serial attached SCSI), or other storage interface. In some implementations, storage controller 128 includes one or more processing units (also sometimes called CPUs or processors or microprocessors or microcontrollers) configured to execute instructions in one or more programs (e.g., in storage controller 128). In some implementations, the one or more processors are shared by one or more components within, and in some cases, beyond the function of storage controller 128.

SPD device 124 is coupled to host interface 122 and data hardening module 126. Serial presence detect (SPD) refers to a standardized way to automatically access information about a computer memory module (e.g., storage device 120). For example, if the memory module has a failure, the failure can be communicated with a host system (e.g., computer system 110) through SPD device 124.

Figure 2:
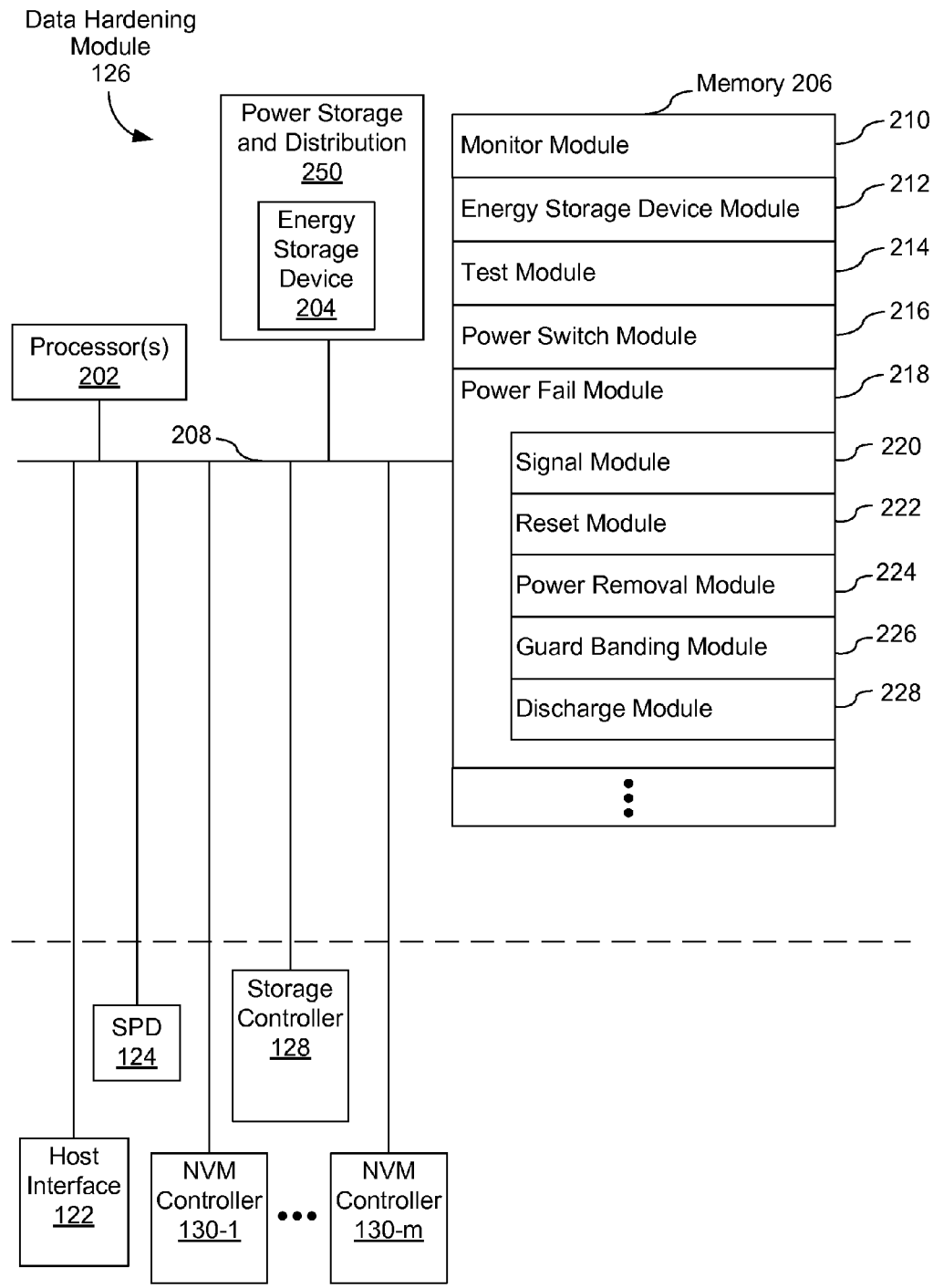
FIG. 2 is a block diagram illustrating an implementation of a data hardening module, in accordance with some embodiments.

FIG. 2 is a block diagram illustrating an implementation of data hardening module 126, in accordance with some embodiments. Data hardening module 126 includes power storage and distribution module 250 (including energy storage device 204). In some embodiments, data hardening module also includes one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. However, in some other embodiments, the functions described below as being performed by processor(s) 202 are instead performed by storage controller 128.

In some implementations, power storage and distribution module 250 includes circuitry for monitoring, storing, and distributing power for a storage device (e.g., storage device 120, FIG. 1), including monitoring, controlling, charging, and/or testing energy storage device 204. In some embodiments, energy storage device 204 includes one or more capacitors. In other embodiments, energy storage device 204 includes one or more inductors or any other passive elements that store energy.

Communication buses 208 optionally include circuitry (sometimes called a chipset) that interconnects and controls communications between system components. Data hardening module 126 is coupled to host interface 122, SPD device 124, storage controller 128, and NVM controllers 130 (e.g., NVM controllers 130-1 through 130-m) by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- a monitor module 210 that is used for monitoring signals provided to a storage device (e.g., storage device 120, FIG. 1), for example to monitor and determine whether a power supply voltage provided to the storage device is higher than an over-voltage threshold;
- an energy storage device module 212 that is used for monitoring, controlling, charging, and/or testing an energy storage device (e.g., energy storage device 204) on the storage device;
- a test module 214 that is used for testing one or more functions of the storage device;
- a power switch module 216 that is used for determining and controlling the voltage that is used to supply power to the storage device; and
- a power fail module 218 that is used for performing a power fail operation in accordance with a determination that a power supply voltage provided to the storage device is higher than an over-voltage threshold.

In some embodiments, memory 206, or the computer readable storage medium of memory 206 further stores a configuration module for configuring storage device 120 and data hardening module 126, and/or configuration values (such as one or more over-voltage threshold values) for configuring data hardening module 126, neither of which is explicitly shown in FIG. 2. In some implementations, upon power up and upon reset, the configuration module automatically sets the values of one or more configuration parameters of storage device 120 (and, optionally, determines which of two or more power fail modules, test modules, etc. to use) in accordance with the components of storage device 120 (e.g., the type of non-volatile memory components in storage device 120) and/or characteristics of the data storage system 100 that includes storage device 120.

In some embodiments, the monitor module 210 is also used for monitoring and determining whether a power supply voltage provided to the storage device is lower than an under-voltage threshold.

In some embodiments, the power fail module 218 optionally includes the following modules or sub-modules, or a subset thereof:

- a signal module 220 that is used for signaling a power fail condition to a plurality of controllers on the storage device (e.g., storage controller 128 and NVM controllers 130, FIG. 1);
- a reset module 222 that is used for resetting the plurality of controllers on the storage device;
- a power removal module 224 that is used for removing power from the plurality of controllers on the storage device;
- a guard banding module 226 that is used for tolerating power fluctuations in a power supply voltage provided to the storage device; and
- a discharge module 228 that is used for discharging the energy storage device on the storage device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 6A-6F.

Although FIG. 2 shows data hardening module 126, FIG. 2 is intended more as a functional description of the various features which may be present in a data hardening module than as a structural schematic of the embodiments described herein. In practice, and as recognized by those of ordinary skill in the art, items shown separately could be combined and some items could be separated.

Figure 3:
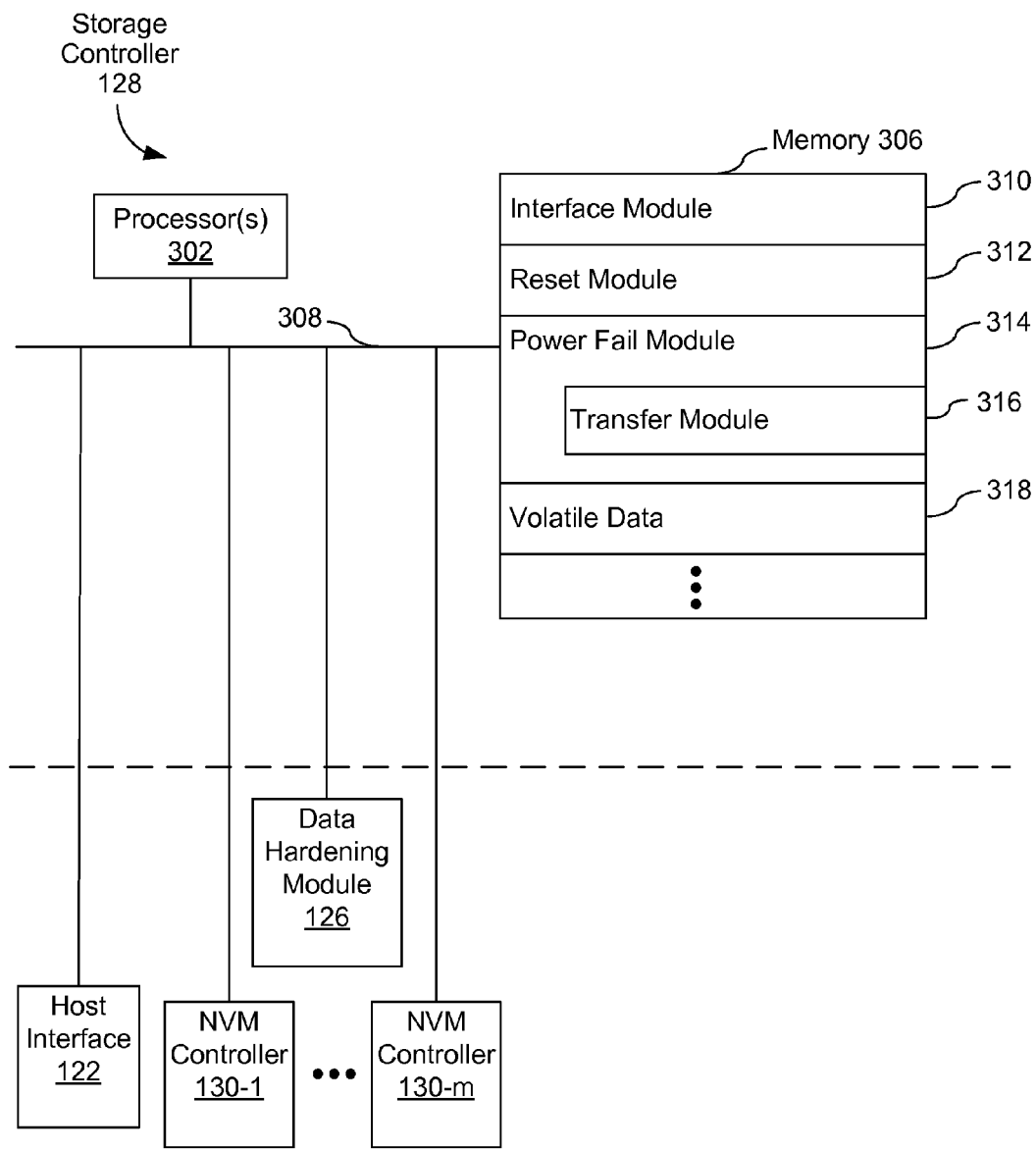
FIG. 3 is a block diagram illustrating an implementation of a storage controller, in accordance with some embodiments.

FIG. 3 is a block diagram illustrating an implementation of a storage controller 128, in accordance with some embodiments. Storage controller 128 typically includes one or more processors (also sometimes called CPUs or processing units or microprocessors or microcontrollers) 302 for executing modules, programs and/or instructions stored in memory 306 and thereby performing processing operations, memory 306, and one or more communication buses 308 for interconnecting these components. Communication buses 308 optionally include circuitry (sometimes called a chipset) that interconnects and controls communications between system components. Storage controller 128 is coupled to host interface 122, data hardening module 126, and NVM controllers 130 (e.g., NVM controllers 130-1 through 130-m) by communication buses 308. Memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 306 optionally includes one or more storage devices remotely located from processor(s) 302. Memory 306, or alternately the non-volatile memory device(s) within memory 306, comprises a non-transitory computer readable storage medium. In some embodiments, memory 306, or the computer readable storage medium of memory 306 stores the following programs, modules, and data structures, or a subset thereof:

- an interface module 310 that is used for communicating with other components, such as host interface 122, data hardening module 126, and NVM controllers 130;
- a reset module 312 that is used for resetting storage controller 128; and
- a power fail module 314 that is used for performing a power fail operation.

In some embodiments, the power fail module 314 optionally includes a transfer module 316 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above. In some embodiments, the programs, modules, and data structures stored in memory 306, or the computer readable storage medium of memory 306, provide instructions for implementing respective operations in the methods described below with reference to FIGS. 6A-6F.

Although FIG. 3 shows a storage controller 128, FIG. 3 is intended more as a functional description of the various features which may be present in a storage controller than as a structural schematic of the embodiments described herein. In practice, and as recognized by those of ordinary skill in the art, items shown separately could be combined and some items could be separated.

Figure 4:
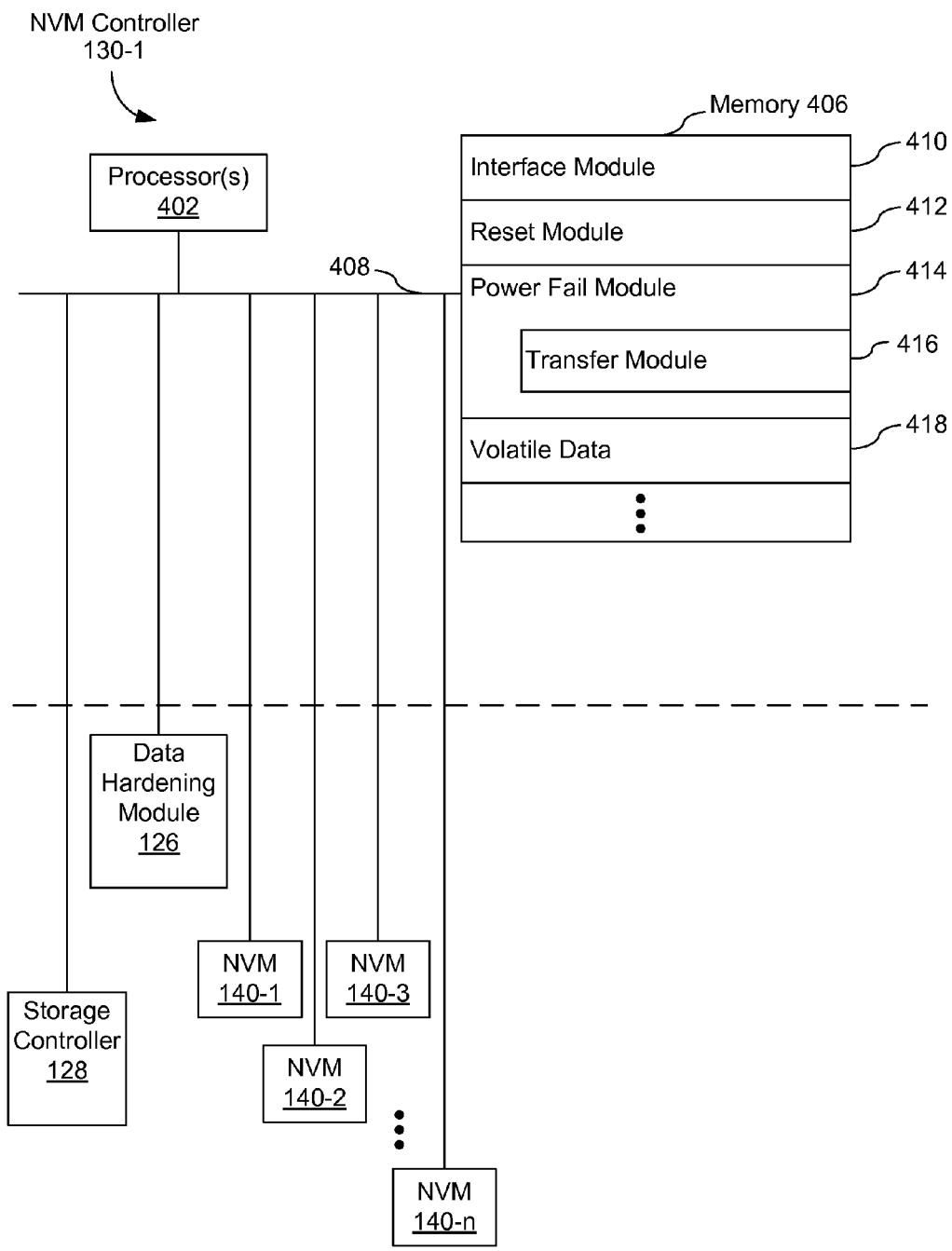
FIG. 4 is a block diagram illustrating an implementation of a NVM controller, in accordance with some embodiments.

FIG. 4 is a block diagram illustrating an implementation of a NVM controller 130-1, such as a flash controller, in accordance with some embodiments. NVM controller 130-1 typically includes one or more processors (also sometimes called CPUs or processing units or microprocessors or microcontrollers) 402 for executing modules, programs and/or instructions stored in memory 306 and thereby performing processing operations, memory 406, and one or more communication buses 408 for interconnecting these components. Communication buses 408 optionally include circuitry (sometimes called a chipset) that interconnects and controls communications between system components. NVM controller 130-1 is coupled to storage controller 128, data hardening module 126, and NVM devices 140 (e.g., NVM devices 140-1 through 140-n, such as flash devices) by communication buses 408. Memory 406 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 406 optionally includes one or more storage devices remotely located from processor(s) 402. Memory 406, or alternately the non-volatile memory device(s) within memory 406, comprises a non-transitory computer readable storage medium. In some embodiments, memory 406, or the computer readable storage medium of memory 406 stores the following programs, modules, and data structures, or a subset thereof:

- an interface module 410 that is used for communicating with other components, such as storage controller 128, data hardening module 126, and NVM devices 140;
- a reset module 412 that is used for resetting NVM controller 130-1; and
- a power fail module 414 that is used for performing a power fail operation.

In some embodiments, the power fail module 414 optionally includes a transfer module 416 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above. In some embodiments, the programs, modules, and data structures stored in memory 406, or the computer readable storage medium of memory 406, provide instructions for implementing respective operations in the methods described below with reference to FIGS. 6A-6F.

Although FIG. 4 shows a NVM controller 130-1, FIG. 4 is intended more as a functional description of the various features which may be present in a NVM controller than as a structural schematic of the embodiments described herein. In practice, and as recognized by those of ordinary skill in the art, items shown separately could be combined and some items could be separated. Further, although FIG. 4 shows a NVM controller 130-1, the description of FIG. 4 similarly applies to other NVM controllers (e.g., NVM controllers 130-2 through 130-m) in storage device 120 (FIG. 1).

Figure 5:
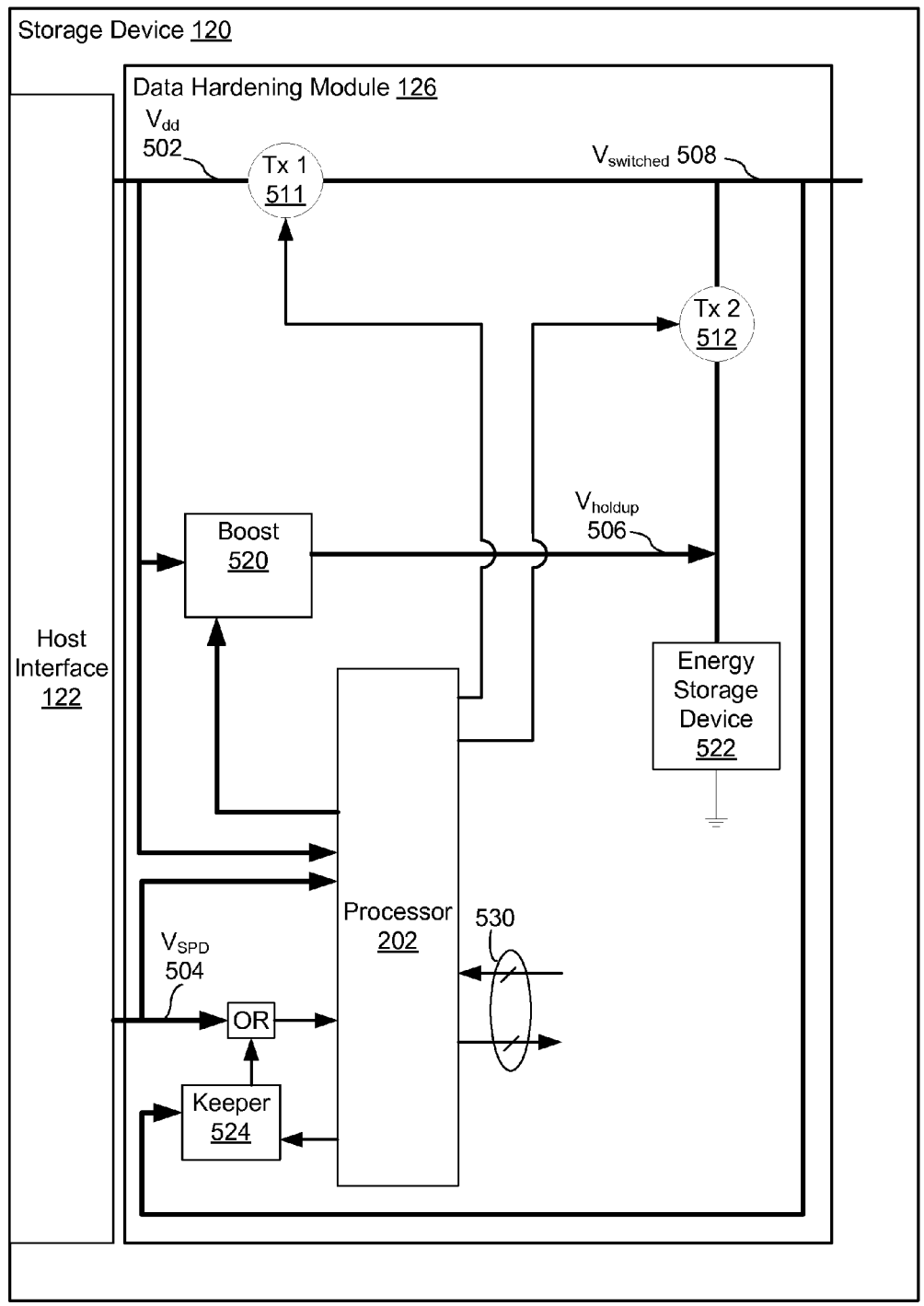
FIG. 5 is a block diagram illustrating an implementation of a data hardening module, in accordance with some embodiments.
Figure 6A:
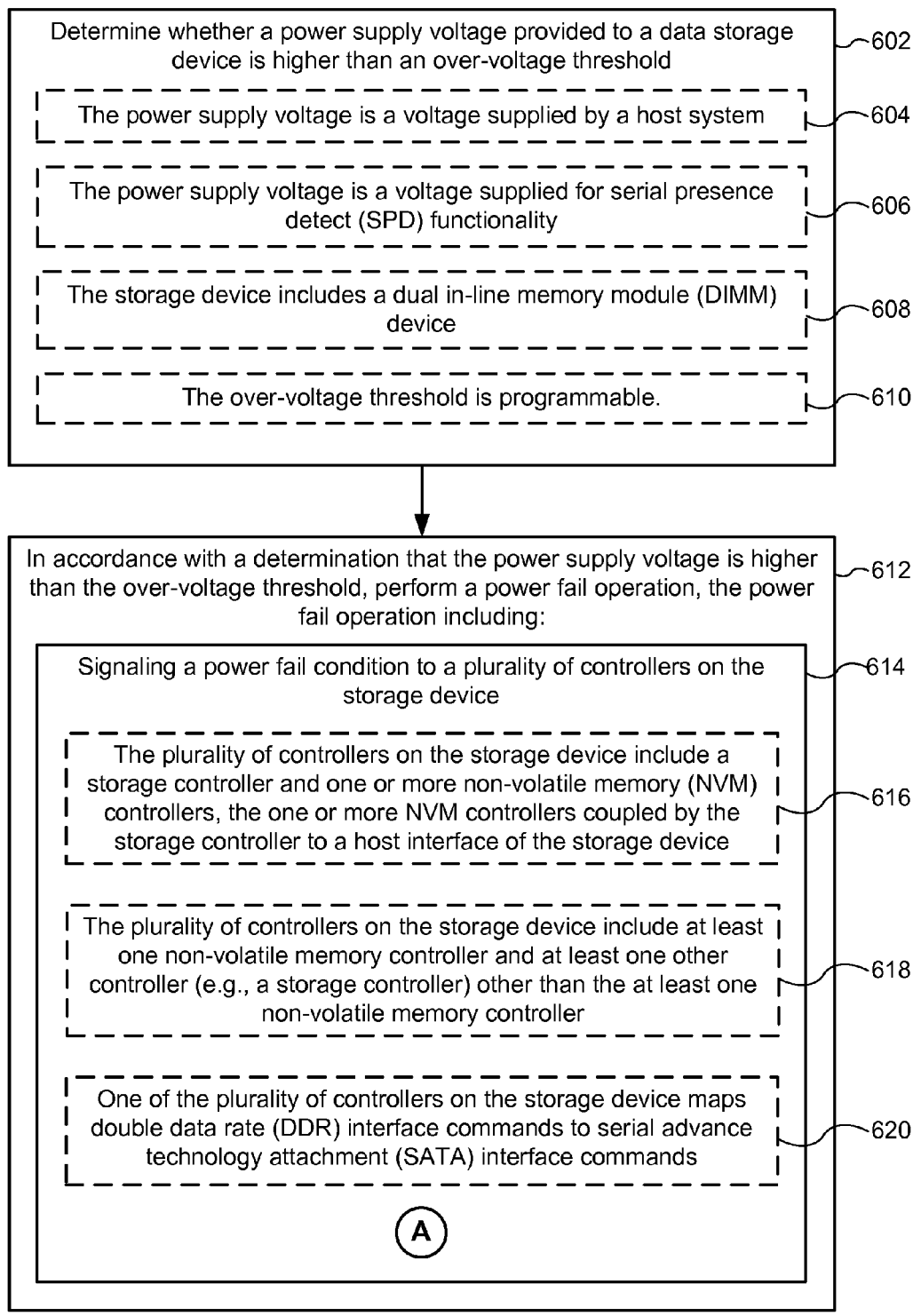
FIGS. 6A-6F illustrate a flowchart representation of a method of protecting data in a storage device, in accordance with some embodiments.
Figure 6B:
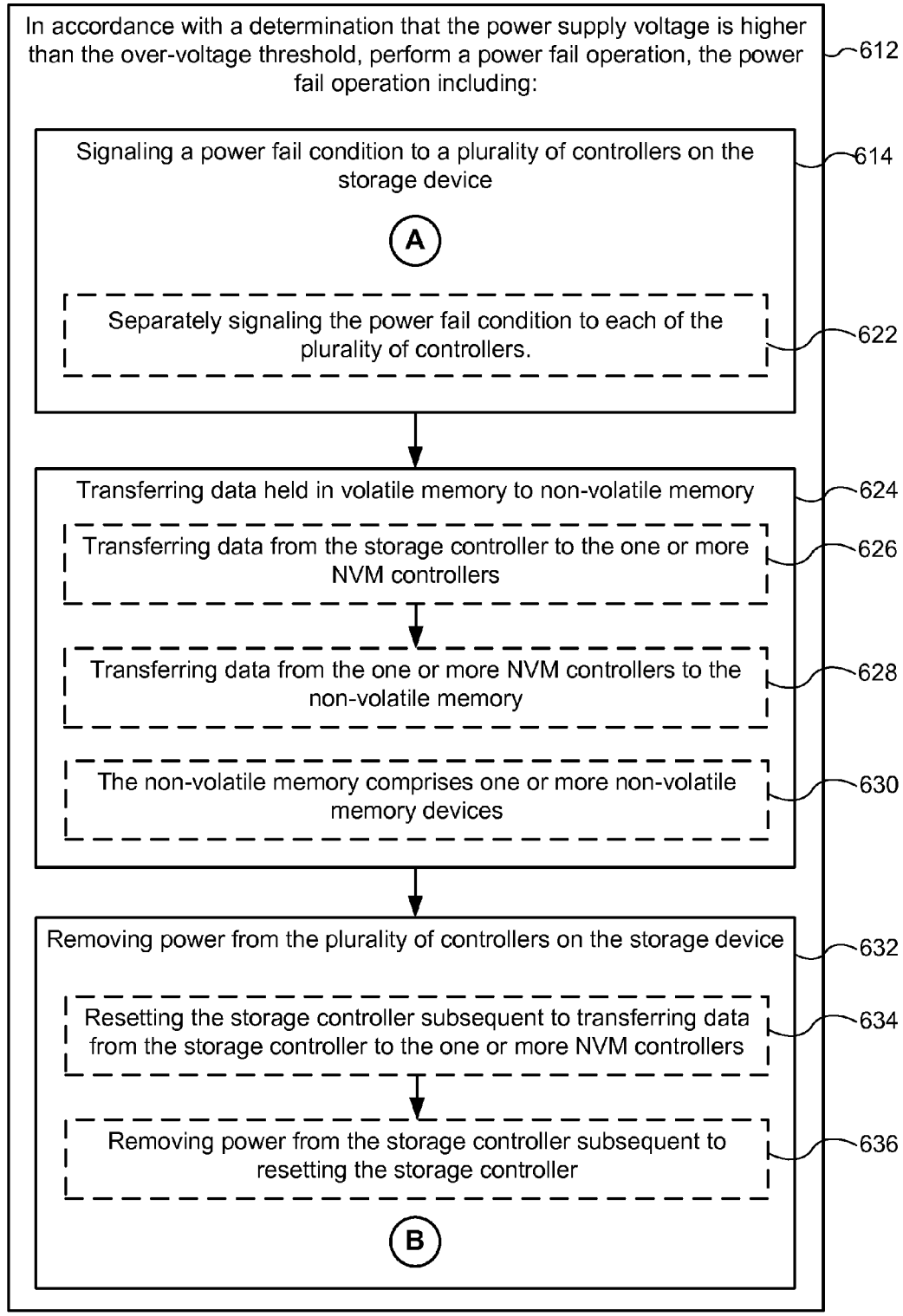
Figure 6C:
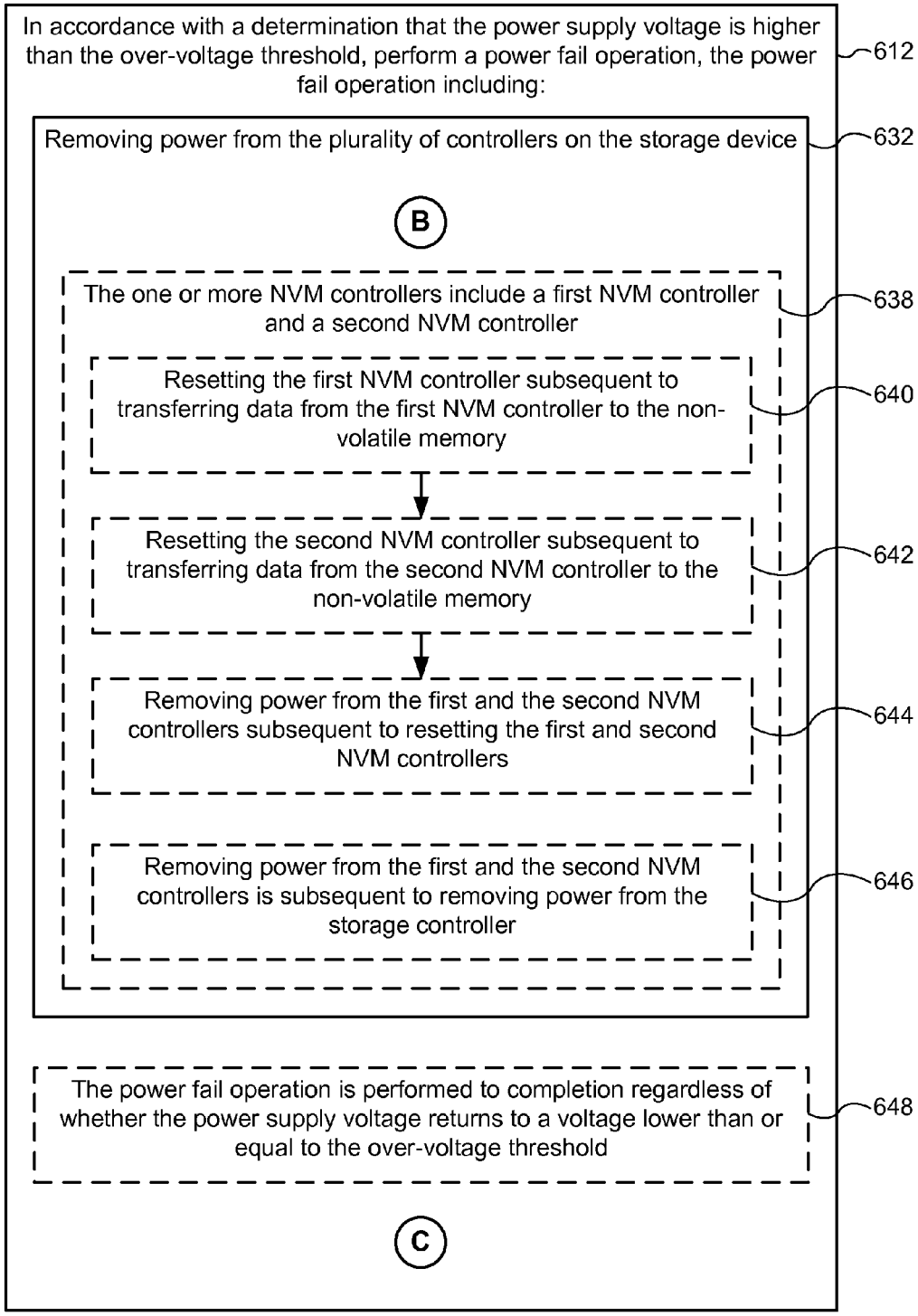
Figure 6D:
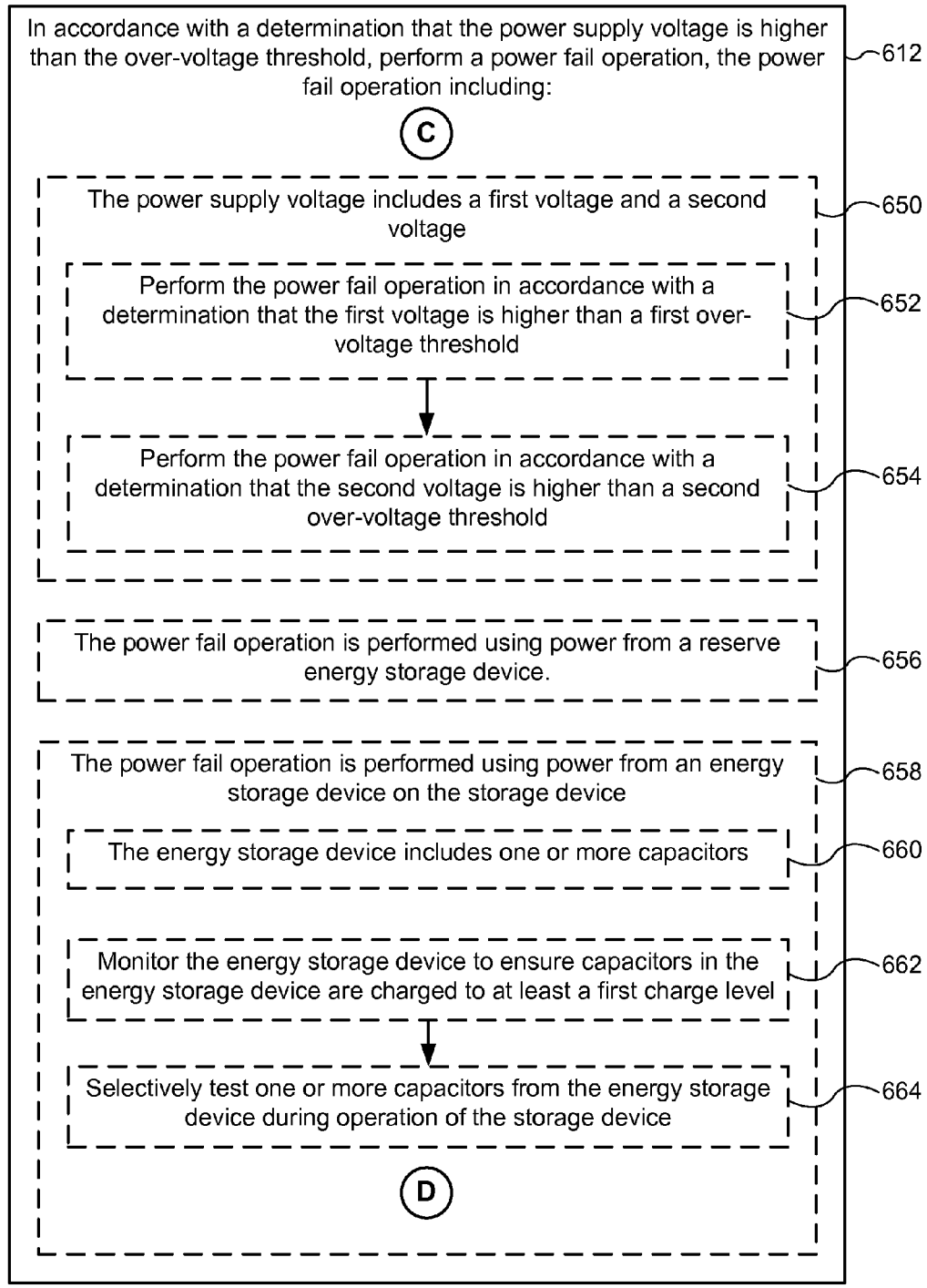
Figure 6E:
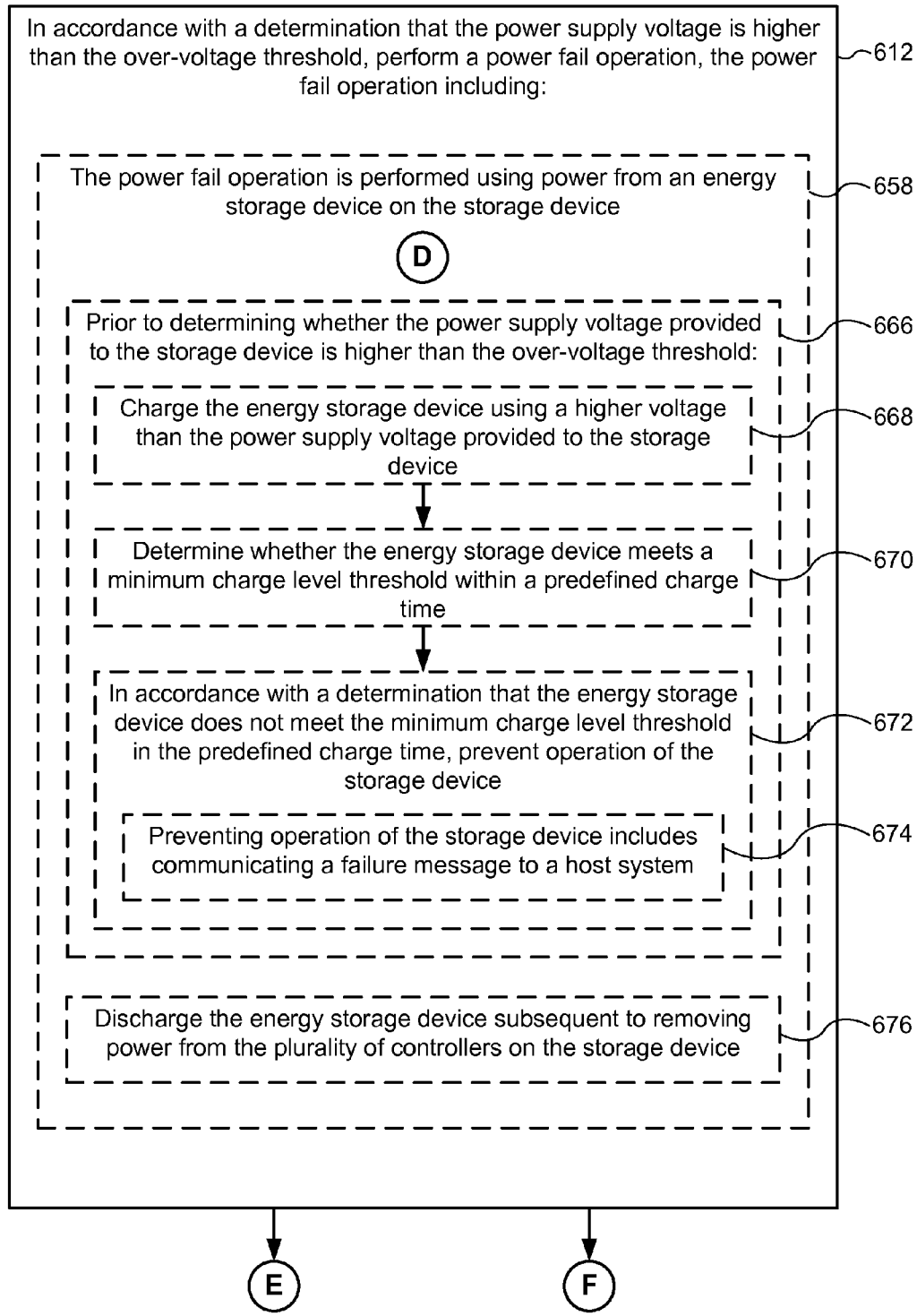
Figure 6F:
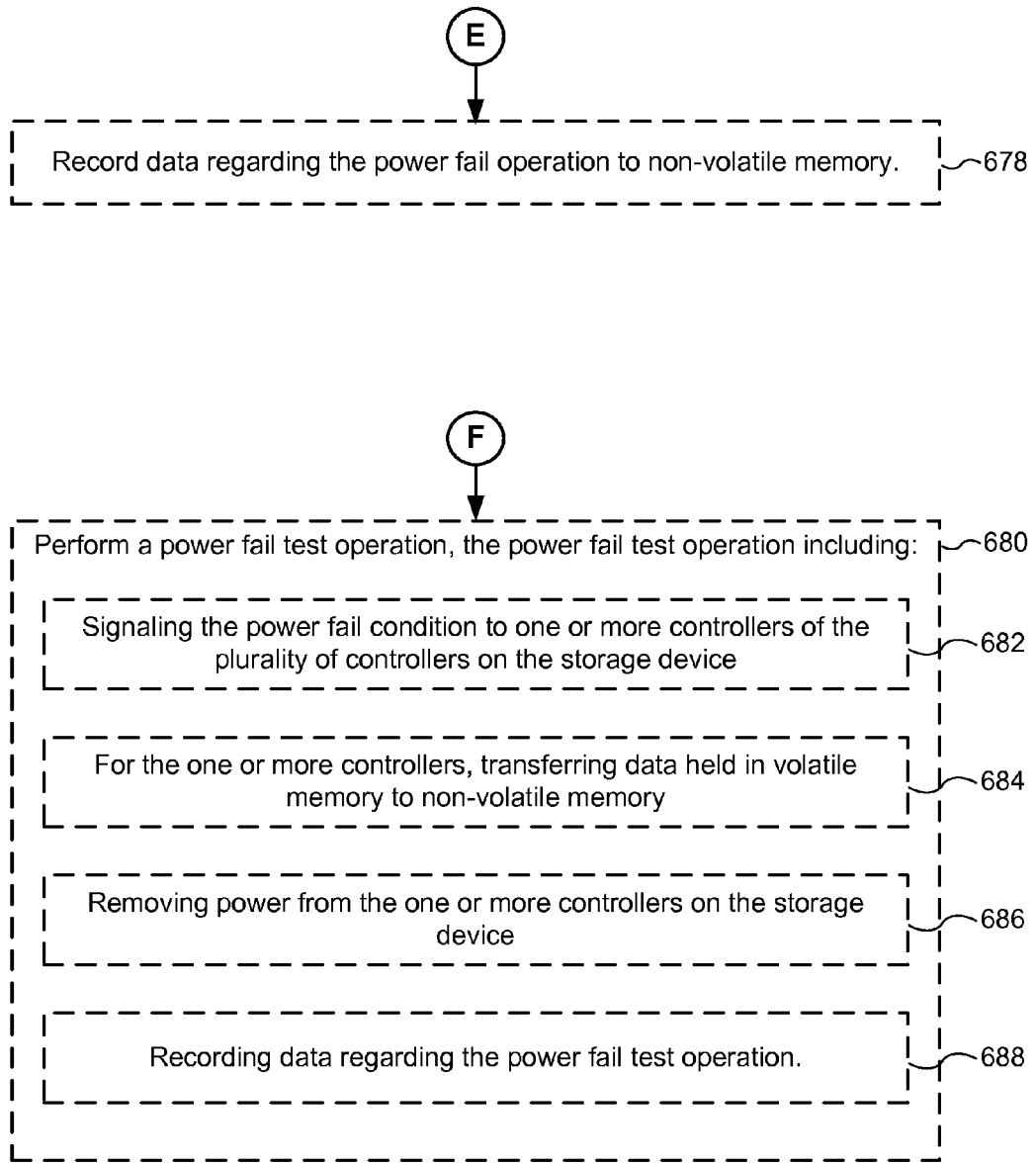

FIG. 5 is a block diagram illustrating an implementation of data hardening module 126, in accordance with some embodiments. While some example features are illustrated, various other features have not been illustrated for the sake of brevity and so as not to obscure more pertinent aspects of the example implementations disclosed herein. To that end, as a non-limiting example, data hardening module 126 includes processor 202, boost circuitry 520, energy storage device 522, transistors 511-512, keeper circuitry 524, voltages $V_{dd}$ 502, $V_{SPD}$ 504, $V_{holdup}$ 506, and $V_{switched}$ 508, and connections 530. In some implementations, $V_{dd}$ 502 is a voltage supplied by a host system (e.g., computer system 110, FIG. 1) and has a target value of 1.5 volts or less. In some implementations, $V_{holdup}$ 506 is a boosted up voltage from $V_{dd}$ 502 and has a target value of 5.7 volts. In some embodiments, $V_{holdup}$ 506 is used to charge an energy storage device 522. In some implementations, $V_{SPD}$ 504 is a voltage supplied for serial presence detect (SPD) functionality and has a target value of 3.3 volts. Further, in some implementations, only one of transistors 511, 512 is enabled at any one time. For example, whenever transistor 512 is enabled, transistor 511 is disabled (open state), so as to ensure that power from the data hardening module's energy storage device 522 is not drained to the host system. Furthermore, whenever transistor 511 is enabled, providing power to components of storage device 120 from the host system, transistor 512 is disabled. In some implementations, the data hardening circuit's energy storage device 522 stores, immediately prior to a power fail condition being detected, at least approximately 30 to 70 millijoules of energy per NVM controller 130 in storage device 120.

In some implementations, processor 202 monitors and manages the functionality in data hardening module 126. For example, processor 202 monitors voltages $V_{dd}$ 502 and $V_{SPD}$ 504. If either $V_{dd}$ 502 or $V_{SPD}$ 504 rise above corresponding over-voltage thresholds, processor 202 signals a power fail condition to a plurality of controllers on storage device 120 (e.g., storage controller 128 and NVM controllers 130, FIG. 1). In some embodiments, the over-voltage threshold varies depending on the target value of the voltage. For example, if the target voltage for $V_{dd}$ 502 is 1.5 volts, the over-voltage threshold may be 1.5 volts plus 5% (i.e., 1.575 volts), so processor 202 would signal a power fail condition if $V_{dd}$ 502 is higher than 1.575 volts. In some implementations, the over-voltage threshold for $V_{dd}$ 502 is different than the over-voltage threshold for $V_{SPD}$ 504. In some embodiments, if either $V_{dd}$ 502 or $V_{SPD}$ 504 fall below corresponding under-voltage thresholds (e.g., 1.425 volts when the target voltage for $V_{dd}$ 502 is 1.5 volts, and 3.135 volts when the target voltage for $V_{SPD}$ 504 is 3.3 volts), processor 202 signals a power fail condition to a plurality of controllers on storage device 120 (e.g., storage controller 128 and NVM controllers 130, FIG. 1).

In some embodiments, during regular operation of storage device 120, $V_{dd}$ 502 is used to supply power to storage device 120. However, during a power fail operation, an energy storage device 522 is used to provide power to storage device 120. In some implementations, processor 202 controls transistors 511-512 to control $V_{switched}$ 508 to be voltage from $V_{dd}$ 502 (e.g., during regular operation) or voltage from energy storage device 522 (e.g., during a power fail operation). For example, during regular operation of storage device 120, $V_{dd}$ 502 is used to supply power to storage device 120, so transistor 511 is turned on (e.g., to complete the connection between $V_{dd}$ 502 and $V_{switched}$ 508) and transistor 512 is turned off (e.g., to disable the connection between energy storage device 522 and $V_{switched}$ 508). However, during a power fail operation, energy storage device 522 is used to provide power to storage device 120, so transistor 511 is turned off (e.g., to disable the connection between $V_{dd}$ 502 and $V_{switched}$ 508) and transistor 512 is turned on (e.g., to enable the connection between energy storage device 522 and $V_{switched}$ 508). Although a single energy storage device 522 is shown in FIG. 5, any energy storage device, including one or more capacitors, one or more inductors, or one or more other passive elements that store energy, may be used to store energy to be used during a power fail operation.

In some implementations, energy storage device 522 is charged using $V_{holdup}$ 506, a voltage higher than $V_{dd}$ 502. In some implementations, $V_{dd}$ 502 is boosted up to $V_{holdup}$ 506 using boost circuitry 520 (e.g., 1.35 volts or 1.5 volts is boosted up to 5.7 volts). In some implementations, boost circuitry 520 is controlled and enabled by processor 202. Further, in some embodiments, $V_{switched}$ 508 is used as an input to keeper circuitry 524, which along with $V_{SPD}$ 504 provides power to processor 202. During a power fail operation, $V_{switched}$ 508 is provided via keeper circuitry 524 to processor 202 so as to provide power to processor 202 during the power fail operation. In some implementations, processor 202 has one or more connections 530 used to monitor and control other functions within storage device 120. In some implementations, $V_{SPD}$ 504 provides power to keeper circuitry 524. Furthermore, in some implementations, $V_{SPD}$ 504 is provided to storage device 120 before $V_{dd}$ 502 is provided to storage device 120, allowing devices in storage device 120 to operate before main power $V_{dd}$ 502 is provide to storage device 120.

FIGS. 6A-6F illustrate a flowchart representation of a method 600 of protecting data in a storage device, in accordance with some embodiments. A storage device (e.g., storage device 120, FIG. 1) coordinates and manages multiple sub-system components to protect data, which initiates performance of method 600. At least in some implementations, method 600 is performed by a storage device (e.g., storage device 120, FIG. 1) or one or more components of the storage device (e.g., data hardening module 126, storage controller 128, and/or NVM controllers 130, FIG. 1). In some embodiments, method 600 is governed by instructions that are stored in a non-transitory computer readable storage medium and that are executed by one or more processors of a device, such as the one or more processors 202 of data hardening module 126, the one or more processors 302 of storage controller 128, and/or the one or more processors 402 of NVM controllers 130, as shown in FIGS. 2-4.

A storage device (e.g., storage device 120, FIG. 1) determines (602) whether a power supply voltage provided to the storage device is higher than an over-voltage threshold. In some embodiments, the over-voltage threshold (sometimes also called a trip point) varies depending on the target value of the voltage. For example, if the target value of the power supply voltage is 1.5 volts, the over-voltage threshold may be 1.5 volts plus 5% (i.e., 1.575 volts), and the storage device determines whether the power supply voltage is higher than 1.575 volts. In some implementations, a monitor module (e.g., monitor module 210, FIG. 2) is used to determine whether a power supply voltage provided to a storage device is higher than an over-voltage threshold, as described above with respect to FIG. 2. In some embodiments, the storage device (e.g., storage device 120, FIG. 1) determines whether a power supply voltage provided to the storage device is lower than an under-voltage threshold. For example, if the target value of the power supply voltage is 1.5 volts, the under-voltage threshold may be 1.5 volts minus 5% (i.e., 1.425 volts), and the storage device determines whether the power supply voltage is lower than 1.425 volts.

In some embodiments, the power supply voltage is (604) a voltage supplied by a host system. In some implementations, the voltage supplied by a host system (e.g., $V_{dd}$ 502, FIG. 5) has a target value of 1.5 volts or less. For example, for a double data rate type three (DDR3) interface specification, the supply voltage is 1.5 volts or 1.35 volts.

In some embodiments, the power supply voltage is (606) a voltage supplied for serial presence detect (SPD) functionality. In some implementations, the voltage supplied for SPD functionality (e.g., $V_{SPD}$ 504, FIG. 5) has a target value of 3.3 volts.

In some embodiments, the storage device includes (608) a dual in-line memory module (DIMM) device. In some implementations, the storage device is compatible with a DIMM memory slot. For example, in some implementations, the storage device is compatible with a 240-pin DIMM memory slot using a DDR3 interface specification.

In some embodiments, the over-voltage threshold is programmable (610). In some implementations, the over-voltage threshold is programmable in accordance with a measurement of a power supply voltage. For example, the programmable over-threshold, or a corresponding parameter, may be stored in non-volatile memory, such as the SPD 124. Optionally, different over-threshold voltages are established for different power supply voltage levels. For example, a lower over-threshold voltage is established when the power supply voltage is 1.35 volts than when the power supply voltage is 1.5 volts. In some implementations, the over-voltage threshold is programmable by a host device such as computer system 110, FIG. 1.

In some implementations, the over-voltage threshold is programmable in accordance with one or more characteristics of the storage device (e.g., storage device 120, FIG. 1), such as the maximum amount of data to be transferred to non-volatile memory during a power fail operation, the availability and charge level of an energy storage device (e.g., energy storage device 204, FIG. 2) used to provide power during the power fail operation, and/or other DIMM related attributes. Similarly, in some implementation in which both an over-voltage threshold and an under-voltage threshold are used, the under-voltage threshold is also programmable, and is optionally programmable in accordance with any of the characteristics of the storage device described above.

Next, the storage device, in accordance with a determination that the power supply voltage is higher than the over-voltage threshold, performs (612) a power fail operation. Using the example above where the target value of the power supply voltage is 1.5 volts and the over-voltage threshold is 1.575 volts, in accordance with a determination that the power supply voltage is higher than 1.575 volts, the storage device performs a power fail operation. In some implementations, a power fail module (e.g., power fail module 218, FIG. 2) is used to perform a power fail operation, in accordance with a determination that the power supply voltage is higher than the over-voltage threshold, as described above with respect to FIG. 2. Furthermore, in some embodiments, the storage device, in accordance with a determination that the power supply voltage is either lower than the under-voltage threshold or higher than the over-voltage threshold, performs a power fail operation.

In some embodiments, one or more power supply voltages are monitored for over-voltage thresholds and the power fail operation is performed if any of the monitored power supply voltages rise above their respective over-voltage thresholds. For example, if two power supply voltages (e.g., a first power supply voltage and a second power supply voltages) are monitored for over-voltage thresholds (e.g., a first over-voltage threshold and a second over-voltage threshold, respectively), the power fail operation is performed in accordance with a determination that the first power supply voltage is higher than the first over-voltage threshold and the power fail operation is performed in accordance with a determination that the second power supply voltage is higher than the second over-voltage threshold. The over-voltage threshold (sometimes called "trip point") varies based on the target value of the power supply voltage. In some embodiments, the first power supply voltage is a voltage supplied by a host system (e.g., with a target value of 1.5 volts or less) and the second power supply voltage is a voltage supplied for serial presence detect (SPD) functionality (e.g., with a target value of 3.3 volts). Further, in some embodiments, one or more power supply voltages are monitored with respect to both over-voltage thresholds and under-voltage thresholds, and the power fail operation is performed if any of the monitored power supply voltages rise above their respective over-voltage thresholds or fall below their respective under-voltage thresholds.

First, the power fail operation includes (612) signaling (614) a power fail condition to a plurality of controllers on the storage device (e.g., storage controller 128 and NVM controllers 130, FIG. 1). In some implementations, a signal module (e.g., signal module 220, FIG. 2) is used to signal a power fail condition to a plurality of controllers on the storage device, as described above with respect to FIG. 2.

In some embodiments, the plurality of controllers on the storage device include (616) a storage controller (e.g., storage controller 128, FIG. 1) and one or more NVM controllers (e.g., NVM controllers 130, FIG. 1), the one or more NVM controllers coupled by the storage controller to a host interface (e.g., host interface 122, FIG. 1) of the storage device.

In some embodiments, the plurality of controllers on the storage device include (618) at least one non-volatile storage controller and at least one other controller other than the at least one non-volatile storage controller (e.g., a storage controller). In some implementations, the at least one non-volatile storage controller is a flash controller (e.g., NVM controller 130-1, FIG. 1). In other implementations, the at least one non-volatile storage controller controls one or more other types of non-volatile memory devices.

In some embodiments, one of the plurality of controllers on the storage device maps (620) double data rate (DDR) interface commands to serial advance technology attachment (SATA) interface commands. For example, a storage controller (e.g., storage controller 128, FIG. 1) maps double data rate type three (DDR3) interface commands to SATA interface commands. In some implementations, a storage controller (e.g., storage controller 128, FIG. 1) uses a defined interface standard, such as DDR3, to communicate with a host interface (e.g., host interface 122, FIG. 1) and uses a defined interface standard, such as SATA, to communicate with other controllers on the storage device (e.g., NVM controllers 130, FIG. 1).

In some embodiments, signaling (614) the power fail condition to the plurality of controllers on the storage device includes separately signaling (622) the power fail condition to each of the plurality of controllers. In some implementations, individual power fail signals to each of the plurality of controllers allow for sequential sequencing of the power fail operation across the plurality of controllers, parallel performance of the power fail operation across the plurality of controllers, or a combination of sequential and parallel sequencing for the power fail operation. In a non-limiting example of a sequential sequence, the power fail operation for a first NVM controller (e.g., NVM controller 130-1, FIG. 1) will be performed prior in time, or started prior in time, to the power fail operation for a second NVM controller (e.g., NVM controller 130-m, FIG. 1). Further, in a non-limiting example of a combination of sequential and parallel sequences, the power fail operations of two or more NVM controllers (e.g., two or more of NVM controllers 130-1 to 130-m, FIG. 1) are performed simultaneously, while the power fail operation for a storage controller (e.g., storage controller 128, FIG. 1) is performed prior to, or started prior to, the parallel power fail operation of the aforementioned NVM controllers.

Next, the power fail operation includes (612) transferring (624) data held in volatile memory to non-volatile memory (e.g., NVM devices 140, 142, FIG. 1). In some implementations, a power fail module on one or more controllers (e.g., power fail module 314, FIG. 3 and power fail module 414, FIG. 4) are used to transfer data held in volatile memory to non-volatile memory, as described above with respect to FIGS. 3-4.

In some embodiments, transferring data held in volatile memory to non-volatile memory includes transferring (626) data (e.g., volatile data 318, FIG. 3) from the storage controller (e.g., storage controller 128, FIG. 1) to the one or more NVM controllers (e.g., NVM controllers 130, FIG. 1). In some implementations, data transferred from the storage controller to the one or more NVM controllers includes data in flight from the host interface (e.g., host interface 122, FIG. 1) to the storage controller, data that has been signaled to the host (e.g., computer system 110, FIG. 1) as saved (e.g., stored in a non-volatile store or write cache), and/or metadata stored in volatile memory in the storage controller. In some implementations, a transfer module (e.g., transfer module 316, FIG. 3) is used to transfer data from the storage controller to the one or more NVM controllers, as described above with respect to FIG. 3.

In some embodiments, transferring data held in volatile memory to non-volatile memory includes transferring (628) data (e.g., volatile data 418, FIG. 4) from the one or more NVM controllers (e.g., NVM controllers 130, FIG. 1) to the non-volatile memory (e.g., NVM devices 140, 142, FIG. 1). In some implementations, data transferred from the one or more NVM controllers to the non-volatile memory includes data in flight to the one or more NVM controllers and/or metadata stored in volatile memory in the one or more NVM controllers (e.g., unwritten parity data, information about current age of the NVM (e.g., flash memory) devices, translation tables, etc.). In some implementations, a transfer module (e.g., transfer module 416, FIG. 4) is used to transfer data from the one or more NVM controllers to the non-volatile memory, as described above with respect to FIG. 4.

In some embodiments, the non-volatile memory comprises (630) one or more NVM devices (e.g., NVM devices 140, 142, FIG. 1). In some implementations, the non-volatile memory includes a single NVM device, while in other implementations the non-volatile memory includes a plurality of NVM devices. In some implementations, the non-volatile memory includes NAND-type flash memory or NOR-type flash memory. In other embodiments, the non-volatile memory comprises one or more other types of non-volatile storage devices.

Next, the power fail operation includes (612) removing (632) power from the plurality of controllers on the storage device (e.g., storage controller 128 and NVM controllers 130, FIG. 1). In some implementations, removing power from the plurality of controllers on the storage device include affirmatively removing power from the plurality of controllers (as opposed to allowing the plurality of controllers to automatically lose power). In some implementations, a power removal module (e.g., power removal module 224, FIG. 2) is used to remove power from the plurality of controllers on the storage device, as described above with respect to FIG. 2.

In some embodiments, removing power from the plurality of controllers on the storage device includes resetting (634) the storage controller subsequent to transferring data from the storage controller to the one or more NVM controllers. In some implementations, the storage controller (e.g., storage controller 128, FIG. 1) sends signals to a data hardening module (e.g., data hardening module 126, FIG. 1) when it has completed transferring data to the one or more NVM controllers (e.g., NVM controllers 130, FIG. 1). When the data hardening module receives this signal (e.g., a data hardening done signal), it can then reset the storage controller. In some implementations, resetting the storage controller puts the storage controller in a predefined low power state. In some implementations, resetting the storage controller is controlled by a data hardening module and reset functionality is disabled while data is being transferred to non-volatile memory (e.g., the data hardening module prevents the storage controller from being reset when the storage controller is transferring data held in volatile memory to non-volatile memory). In some implementations, a reset module in the data hardening module (e.g., reset module 222, FIG. 2) in conjunction with a reset module in the storage controller (e.g., reset module 312, FIG. 3) is used to reset the storage controller subsequent to transferring data from the storage controller to the one or more NVM controllers, as described above with respect to FIGS. 2-3.

Next, in some embodiments, removing power from the plurality of controllers on the storage device includes removing (636) power from the storage controller subsequent to resetting the storage controller. In some implementations, the storage controller (e.g., storage controller 128, FIG. 1) is in a separate power domain from the one or more NVM controllers (e.g., NVM controller 130, FIG. 1). Thus, power may be removed from the storage controller, regardless of whether the NVM controllers are still transferring data to non-volatile memory. These independent power domains allow the data hardening module (e.g., data hardening module 126, FIG. 1) to selectively remove power from the various controllers on the storage device (e.g., storage device 120, FIG. 1). By selectively removing power to controllers as they are ready, the data hardening module preserves the power stored in the energy storage device (e.g., energy storage device 204, FIG. 2) for remaining tasks in the power fail operation. In some implementations, a power removal module (e.g., power removal module 224, FIG. 2) is used to remove power from the storage controller subsequent to resetting the storage controller, as described above with respect to FIG. 2.

In some embodiments, the one or more NVM controllers include (638) a first NVM controller and a second NVM controller (e.g., first and second flash controllers) and removing power from the plurality of controllers on the storage device includes resetting (640) the first NVM controller subsequent to transferring data from the first NVM controller to the non-volatile memory. In some implementations, the first NVM controller (e.g., NVM controller 130-1, FIG. 1) sends signals to a data hardening module (e.g., data hardening module 126, FIG. 1) when it has completed transferring data to the non-volatile memory (e.g., NVM devices 140). When the data hardening module receives this signal (e.g., a data hardening done signal), it can then reset the first NVM controller. In some implementations, resetting the first NVM controller puts the first NVM controller in a predefined low power state. In some implementations, the data hardening module prevents the first NVM controller from being reset when the first NVM controller is transferring data held in volatile memory to non-volatile memory. In some implementations, a reset module in the data hardening module (e.g., reset module 222, FIG. 2) in conjunction with a reset module in the first NVM controller (e.g., reset module 412, FIG. 4) is used to reset the first NVM controller subsequent to transferring data from the first NVM controller to the non-volatile memory, as described above with respect to FIGS. 2 and 4.

In some embodiments, the one or more NVM controllers include (638) a first NVM controller and a second NVM controller (e.g., first and second flash controllers) and removing power from the plurality of controllers on the storage device further includes resetting (642) the second NVM controller subsequent to transferring data from the second NVM controller to the non-volatile memory. Explanations provided above in connection with resetting the first NVM controller (in operation 640) are equally applicable to resetting the second NVM controller. In some implementations, a reset module in the data hardening module (e.g., reset module 222, FIG. 2) in conjunction with a reset module in the second NVM controller (e.g., reset module 412, FIG. 4) is used to reset the second NVM controller subsequent to transferring data from the second NVM controller to the non-volatile memory, as described above with respect to FIGS. 2 and 4.

In some embodiments, the one or more NVM controllers include (638) a first NVM controller and a second NVM controller (e.g., first and second flash controllers) and removing power from the plurality of controllers on the storage device further includes removing (644) power from the first and the second NVM controllers subsequent to resetting the first and second NVM controllers. In some embodiments, the first NVM controller and the second NVM controller share the same power domain, and power is removed from the first and the second NVM controllers after both the first and the second NVM controllers have been reset. In some embodiments, the first NVM controller is in a first power domain and the second NVM controller is in a second power domain, and power is removed from the first NVM controller independent of when power is removed from the second NVM controller. In some implementations, a power removal module (e.g., power removal module 224, FIG. 2) is used to remove power from the first and the second NVM controllers subsequent to resetting the first and second NVM controllers, as described above with respect to FIG. 2.

In some embodiments, removing (646) power from the first and the second NVM controllers is subsequent to removing power from the storage controller. As discussed above, independent power domains on the storage device allow a data hardening module (e.g., data hardening module 126, FIG. 1) to selectively remove power from the various controllers on the storage device (e.g., storage controller 128 and NVM controllers 130, FIG. 1). In some implementations, data hardening is completed in a cascading manner since the NVM controllers cannot finish hardening data until they have received all the volatile data that needs to be transferred from the storage controller. As a result, the storage controller will complete its data hardening first and thus, power will be removed from the storage controller before power is removed from the first and the second NVM controllers.

In some embodiments, the power fail operation is (648) performed to completion regardless of whether the power supply voltage returns to a voltage lower than or equal to the over-voltage threshold. In some implementations, even if the power fail condition is temporary (e.g., a lightning strike that briefly causes the power supply voltage to flicker above the over-voltage threshold), the power fail operation is performed to completion. In some implementations, once a power fail operation begins, the data hardening module (e.g., data hardening module 126, FIG. 1) effectively disconnects from the power supply voltage provided to the storage device and ignores the power supply voltage until the power fail operation is complete. In some embodiments, the power fail operation is performed to completion regardless of whether the power supply voltage returns to a voltage that is both greater than or equal to the under-voltage threshold and lower than or equal to the over-voltage threshold.

In some embodiments, the power supply voltage includes (650) a first voltage and a second voltage, and performing the power fail operation includes (612) performing (652) the power fail operation in accordance with a determination that the first voltage is higher than a first over-voltage threshold. In some embodiments, the first voltage is a voltage supplied by a host system (e.g., $V_{dd}$ 502, FIG. 5) and the first voltage has a target value of 1.5 volts or less. For example, for a double data rate type three (DDR3) interface specification, the first voltage supplied by a host system is 1.5 volts or 1.35 volts. In addition, in some embodiments, the performing the power fail operation includes performing the power fail operation in accordance with a determination that the first voltage is either lower than a first under-voltage threshold or higher than a first over-voltage threshold.

Next, where the power supply voltage includes (650) a first voltage and a second voltage, performing the power fail operation includes (612) performing (654) the power fail operation in accordance with a determination that the second voltage is higher than a second under-threshold voltage. In some embodiments, the second voltage is a voltage supplied for serial presence detect (SPD) functionality (e.g., $V_{SPD}$ 504, FIG. 5) and the second voltage has a target value of 3.3 volts. In addition, in some embodiments, the performing the power fail operation includes performing the power fail operation in accordance with a determination that the second voltage is either lower than a second under-voltage threshold or higher than a second over-voltage threshold.

In some embodiments, the power fail operation (658) is performed using power from an energy storage device (e.g., energy storage device 204, FIG. 2) on the storage device (e.g., storage device 120, FIG. 1). Alternatively, the power fail operation is performed (656) using power from a reserve energy storage device external to the storage device. As described above with respect to FIG. 5, during a power fail operation, an energy storage device 522 is used to provide power to the storage device, and a data hardening module (e.g., data hardening module 126, FIGS. 1 and 5) is used to connect and disconnect the appropriate power sources (e.g., disabling the connection between $V_{dd}$ 502 and $V_{switched}$ 508 and enabling the connection between energy storage device 522 and $V_{switched}$ 508, FIG. 5).

In some embodiments, the energy storage device includes (660) one or more capacitors. For example, in some implementations, the energy storage device 522 includes a single capacitor, while in other implementations, the energy storage device includes a plurality of capacitors. In other implementations, the energy storage device includes one or more inductors. In some implementations, the energy storage device includes one or more other passive elements that store energy.

Optionally, the storage device monitors (662) the energy storage device to ensure capacitors in the energy storage device are charged to at least a first charge level. In some implementations, a data hardening module (e.g., data hardening module 126, FIG. 1) performs health monitoring for the energy storage device and monitors the capacitor(s) in the energy storage device. For example, if the first charge level is 98% (or, alternatively, 95% or 90%) of charge capacity, the data hardening module monitors the energy storage device to ensure the capacitor(s) in the energy storage device are charged to at least 98% (or, alternatively, 95% or 90%) of charge capacity. In some implementations, if one or more capacitors of the energy storage device are not charged to at least the first charge level, the storage device performs one or more remedial actions (e.g., further charging the one or more capacitors). In some implementations, an energy storage device module (e.g., energy storage device module 212, FIG. 2) is used to monitor the energy storage device to ensure capacitors in the energy storage device are charged to at least a first charge level, as described above with respect to FIG. 2.

Further, the storage device selectively tests (664) one or more capacitors from the energy storage device during operation of the storage device. In some implementations, the data hardening module (e.g., data hardening module 126, FIG. 1) uses an algorithm to selectively test one or more capacitors from the energy storage device during operation of the storage device. In some implementations, one or more capacitors from the energy storage device are tested during regular operation of the storage device (as opposed to during a power fail operation). Since testing the capacitor(s) will discharge the capacitor(s), the data hardening module manages the coordination of testing the capacitor(s) to ensure that testing of the capacitor(s) from the energy storage device does not interfere with a potential power fail operation. In some implementations, an energy storage device module (e.g., energy storage device module 212, FIG. 2) is used to selectively test one or more capacitors from the energy storage device during operation of the storage device, as described above with respect to FIG. 2.

Optionally, prior to determining (666) whether the power supply voltage provided to the storage device is higher than the over-voltage threshold, the storage device charges (668) the energy storage device using a higher voltage than the power supply voltage provided to the storage device. As described above with respect to FIG. 5, an energy storage device 522 is charged using a higher voltage (e.g., $V_{holdup}$ 506, FIG. 5) than the power supply voltage provided to the storage device (e.g., $V_{dd}$ 502 or $V_{SPD}$ 504, FIG. 5). For example, in some implementations, the energy storage device is charged using $V_{holdup}$ (e.g., $V_{holdup}$ 506, FIG. 5, with a target value of 5.7 volts), which is a higher voltage than $V_{dd}$ 502 or $V_{SPD}$ 504, FIG. 5, with target values of 1.35/1.5 volts and 3.3 volts, respectively). In some implementations, the energy storage device is charged with dynamic inrush current control. In some implementations, an energy storage device module (e.g., energy storage device module 212, FIG. 2) is used to charge the energy storage device using a higher voltage than the power supply voltage provided to the storage device, as described above with respect to FIG. 2. In some embodiments, the storage device charges the energy storage device using a higher voltage than the power supply voltage provided to the storage device prior to determining whether the power supply voltage provided to the storage device is either lower than the under-voltage threshold or higher than the over-voltage threshold.

Next, the storage device determines (670) whether the energy storage device (e.g., energy storage device 204, FIG. 2) meets a minimum charge level threshold within a predefined charge time. For example, if the minimum charge level threshold is 95% charge capacity and the predefined charge time is 25 ms, the storage device determines whether the energy storage device is charged to at least 95% charge capacity within 25 ms. In some implementations, an energy storage device module (e.g., energy storage device module 212, FIG. 2) is used to determine whether the energy storage device meets a minimum charge level threshold within a predefined charge time, as described above with respect to FIG. 2.

Further, in accordance with a determination that the energy storage device does not meet the minimum charge level threshold in the predefined charge time, the storage device prevents (672) operation of the storage device. In some implementations, a determination that the energy storage device does not meet the minimum charge level threshold in the predefined charge time indicates that there will be a data hardening failure when a power fail operation is performed in the future (e.g., a predictive failure detection). As a result, operation of the storage device is prevented to avoid a future data hardening failure. In some implementations, an energy storage device module (e.g., energy storage device module 212, FIG. 2) is used to prevent operation of the storage device, in accordance with a determination that the energy storage device does not meet the minimum charge level threshold in the predefined charge time, as described above with respect to FIG. 2.

In some embodiments, preventing operation of the storage device includes communicating (674) a failure message to a host system (e.g., computer system 110, FIG. 1). In some implementations, the failure message is communicated with the host system through a SPD device (e.g., SPD device 124, FIG. 1) or a SPD bus controller.

Optionally, the storage device discharges (676) the energy storage device subsequent to removing power from the plurality of controllers on the storage device. In some implementations, subsequent to removing power from the plurality of controllers (e.g., storage controller 128 and NVM controllers 130, FIG. 1) on the storage device (e.g., storage device 120, FIG. 1), the storage device discharges the energy storage device (e.g., energy storage device, FIG. 2) and the storage device shuts down like a regular hard power down. In some implementations, discharging the energy storage device includes discharging one or more capacitors of the energy storage device. In some implementations, a discharge module (e.g., discharge module 228, FIG. 2) is used to discharge the energy storage device subsequent to removing power from the plurality of controllers on the storage device, as described above with respect to FIG. 2.

In some embodiments, the method 600 of protecting data in a storage device further comprises recording data (678) regarding the power fail operation to non-volatile memory. In some implementations, recording data regarding the power fail operation includes recording one or more of the following: which power supply voltage caused the power fail operation (e.g., $V_{dd}$ 502 or $V_{SPD}$ 504), what condition caused the power fail operation (e.g., lower than an under-voltage threshold or higher than an over-voltage threshold), the real time when the power fail event happened (e.g., Monday, Oct. 15, 2013, at 12:03:17 AM), the length of time the power fail operation took to complete, whether the power fail operation was successful, and optionally other information regarding the power fail operation.

In some embodiments, the method 600 of protecting data in a storage device further comprises performing a power fail test operation (680). A power fail test operation may be initiated without the actual occurrence of a power failure. For example, a power fail test operation may be initiated by a command from a host system, or when a milestone event is detected (e.g., a real time clock matching a scheduled test time), without the actual occurrence of a power failure. The power fail test operation includes signaling (682) the power fail condition to one or more controllers of the plurality of controllers on the storage device, transferring (684) data held in volatile memory to non-volatile memory for the one or more controllers, removing (686) power from the one or more controllers on the storage device, and recording (688) data regarding the power fail test operation. In some implementations, the recorded data regarding the power fail test operation includes one or more of: the length of time the power fail test operation took to complete, whether the power fail operation was successful, and optionally other information regarding the power fail test operation.

In some implementations, with respect to any of the methods described above, the non-volatile memory is a single NVM device (e.g., flash memory device), while in other implementations, the non-volatile memory includes a plurality of NVM devices (e.g., flash memory devices).

In some implementations, with respect to any of the methods described above, a storage device includes (1) an interface for coupling the storage device to a host system, (2) a plurality of controllers, each of the plurality of controllers configured to transfer data held in volatile memory to non-volatile memory, and (3) a data hardening module including one or more processors and an energy storage device, the storage device configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of protecting data in a storage device, the method comprising:
   determining whether a power supply voltage provided to the storage device is higher than an over-voltage threshold; and
   in accordance with a determination that the power supply voltage is higher than the over-voltage threshold, performing a power fail operation, the power fail operation including:
      signaling a power fail condition to a plurality of controllers on the storage device;
      transferring data held in volatile memory to non-volatile memory; and
      removing power from the plurality of controllers on the storage device.

2. The method of claim 1, wherein the plurality of controllers on the storage device include a storage controller and one or more non-volatile memory (NVM) controllers, the one or more NVM controllers coupled by the storage controller to a host interface of the storage device.

3. The method of claim 2, wherein transferring data held in volatile memory to non-volatile memory includes:
   transferring data from the storage controller to the one or more NVM controllers; and
   transferring data from the one or more NVM controllers to the non-volatile memory.

4. The method of claim 3, wherein removing power from the plurality of controllers on the storage device includes:
   resetting the storage controller subsequent to transferring data from the storage controller to the one or more NVM controllers; and
   removing power from the storage controller subsequent to resetting the storage controller.

5. The method of claim 3, wherein the one or more NVM controllers include a first NVM controller and a second NVM controller, and wherein removing power from the plurality of controllers on the storage device includes:
   resetting the first NVM controller subsequent to transferring data from the first NVM controller to the non-volatile memory;
   resetting the second NVM controller subsequent to transferring data from the second NVM controller to the non-volatile memory; and
   removing power from the first and the second NVM controllers subsequent to resetting the first and second NVM controllers.

6. The method of claim 5, wherein removing power from the first and the second NVM controllers is subsequent to removing power from the storage controller.

7. The method of claim 1, wherein the power fail operation is performed to completion regardless of whether the power supply voltage returns to a voltage lower than or equal to the over-voltage threshold.

8. The method of claim 1, wherein the power supply voltage is a voltage supplied by a host system.

9. The method of claim 1, wherein the power supply voltage is a voltage supplied for serial presence detect (SPD) functionality.

10. The method of claim 1, wherein the power supply voltage includes a first voltage and a second voltage, and wherein performing the power fail operation includes:
    performing the power fail operation in accordance with a determination that the first voltage is higher than a first over-voltage threshold; and
    performing the power fail operation in accordance with a determination that the second voltage is higher than a second over-voltage threshold.

11. The method of claim 1, wherein the power fail operation is performed using power from a reserve energy storage device.

12. The method of claim 1, wherein the power fail operation is performed using power from an energy storage device on the storage device.

13. The method of claim 12, wherein the energy storage device includes one or more capacitors.

14. The method of claim 12, further comprising:
    monitoring the energy storage device to ensure capacitors in the energy storage device are charged to at least a first charge level; and
    selectively testing one or more capacitors from the energy storage device during operation of the storage device.

15. The method of claim 12, further comprising:
prior to determining whether the power supply voltage provided to the storage device is higher than the over-voltage threshold:
charging the energy storage device using a higher voltage than the power supply voltage provided to the storage device;
determining whether the energy storage device meets a minimum charge level threshold within a predefined charge time; and
in accordance with a determination that the energy storage device does not meet the minimum charge level threshold in the predefined charge time, preventing operation of the storage device.

16. The method of claim 15, wherein preventing operation of the storage device includes communicating a failure message to a host system.

17. The method of claim 12, further comprising discharging the energy storage device subsequent to removing power from the plurality of controllers on the storage device.

18. The method of claim 1, wherein the non-volatile memory comprises one or more NVM devices.

19. The method of claim 1, wherein the storage device includes a dual in-line memory module (DIMM) device.

20. The method of claim 1, wherein the plurality of controllers on the storage device include at least one non-volatile storage controller and at least one other storage controller other than the at least one non-volatile storage controller.

21. The method of claim 1, wherein one of the plurality of controllers on the storage device maps double data rate (DDR) interface commands to serial advance technology attachment (SATA) interface commands.

22. The method of claim 1, wherein the over-voltage threshold is programmable.

23. The method of claim 1, wherein signaling the power fail condition to the plurality of controllers on the storage device includes separately signaling the power fail condition to each of the plurality of controllers.

24. The method of claim 1, further comprising recording data regarding the power fail operation to non-volatile memory.

25. The method of claim 1, further comprising performing a power fail test operation, the power fail test operation including:
signaling the power fail condition to one or more controllers of the plurality of controllers on the storage device;
for the one or more controllers, transferring data held in volatile memory to non-volatile memory;
removing power from the one or more controllers on the storage device; and
recording data regarding the power fail test operation.

26. A storage device, comprising:
an interface for coupling the storage device to a host system;
a plurality of controllers, each of the plurality of controllers configured to transfer data held in volatile memory to non-volatile memory; and
a data hardening module including an energy storage device, the data hardening module configured to:
determine whether a power supply voltage provided to the storage device is higher than an over-voltage threshold; and
in accordance with a determination that the power supply voltage is higher than the over-voltage threshold, perform a power fail operation, the power fail operation including:
signaling a power fail condition to the plurality of controllers, causing the plurality of controllers to transfer data held in volatile memory to non-volatile memory; and
removing power from the plurality of controllers on the storage device.

27. A non-transitory computer readable storage medium, storing one or more programs for execution by one or more processors of a storage device having a plurality of controllers and a data hardening module, the one or more programs including instructions that when executed cause the storage device to:
determine whether a power supply voltage provided to the storage device is higher than an over-voltage threshold; and
in accordance with a determination that the power supply voltage is higher than the over-voltage threshold, perform a power fail operation, the power fail operation including:
signaling a power fail condition to a plurality of controllers on the storage device;
transferring data held in volatile memory to non-volatile memory; and
removing power from the plurality of controllers on the storage device.

* * * * *